UNITED STATES PATENT OFFICE.

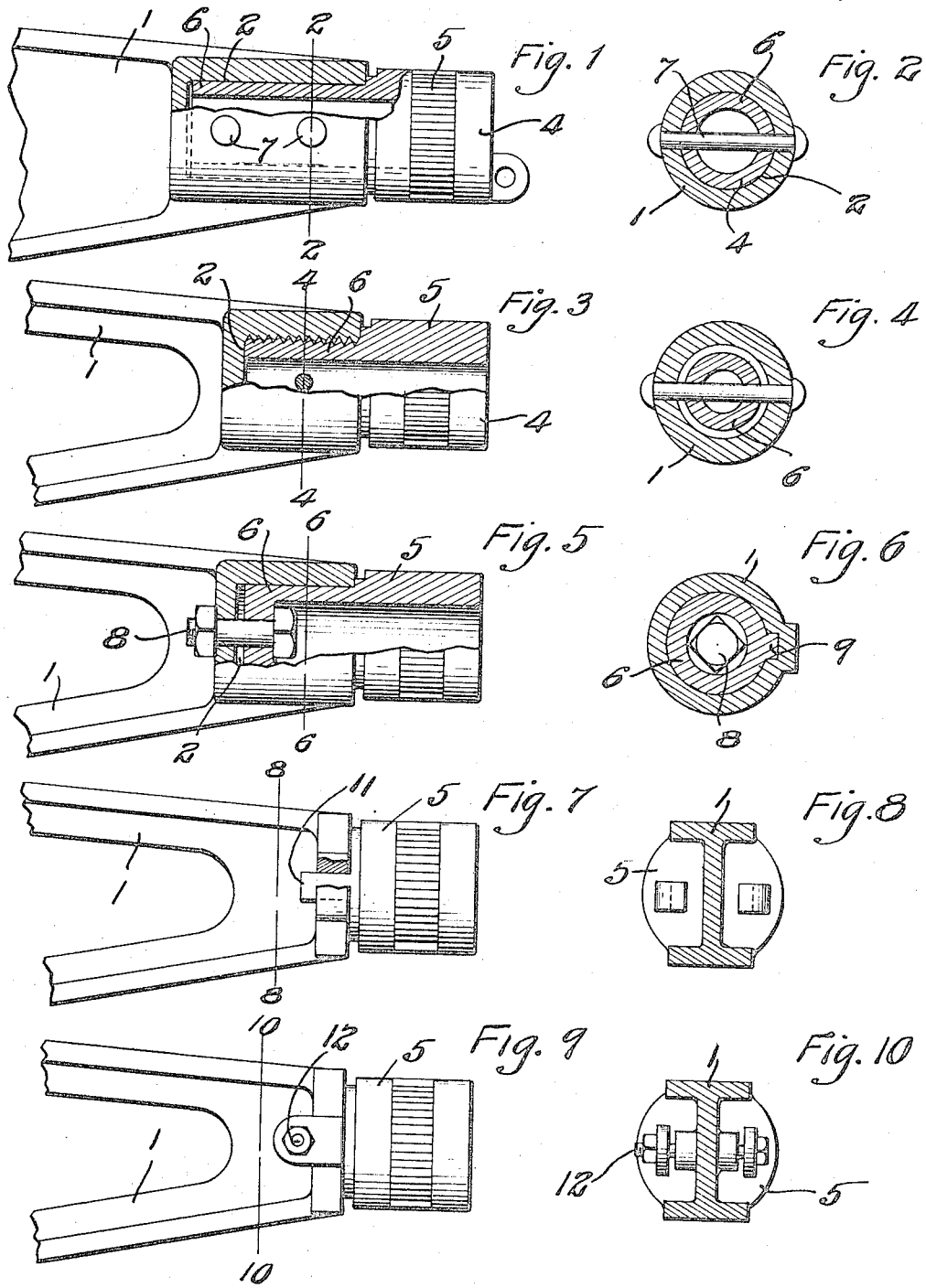

CHARLES H. WILLIAMS, JR., OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

1,144,403.

Specification of Letters Patent. Patented June 29, 1915.

Application filed July 13, 1914. Serial No. 850,712.

*To all whom it may concern:*

Be it known that I, CHARLES H. WILLIAMS, Jr., a citizen of the United States, residing at the city of Chicago, county of Cook, and State of Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification.

This invention relates to certain new and useful improvements in brake beams, the object being to construct a brake beam in such fashion that the parts most liable to wear may be renewed.

The economy of brake beams, and particularly of integrally cast brake beams, is seriously affected by the wear of the trunnion ends on which the adjustable brake heads are mounted.

The subject matter of this invention was originally disclosed in my copending application, Serial Number 769,457, filed May 23, 1913, patented August 11, 1914, No. 1,106,765.

In the drawings, Figure 1 represents a detail view of one end of a brake beam illustrating one form of mounting of the brake head trunnion, the same being shown partly in section. Fig. 2 is a sectional view taken on line 2—2 of Fig. 1. Fig. 3 illustrates a modified form. Fig. 4 is a section on line 4—4 thereof. Fig. 5 is a second modified form. Fig. 6 is a section on line 6—6 thereof. Fig. 7 shows another form. Fig. 8, a section taken on line 8—8 thereof. Fig. 9 shows a fifth form. Fig. 10 is a section on line 10—10 thereof.

While the forms illustrated show portions of integrally cast brake beams, it is obvious that my invention is equally applicable to built-up brake beams.

By reference to Figs. 1 to 6 inclusive, it will be understood that the brake beam end 1 is provided with a longitudinally directed pocket 2, which, of course, may be cylindrical or of other conformation. The removable trunnion member 4 is formed separately and has the bearing portion 5 adapted for the reception of the brake head and a reduced arbor portion 6. The arbor portion is adapted to fit within the pocket 2, having close contact therewith at all sides so as to insure a firm support of the trunnion against thrusts in any direction. It will be seen that the inner extremity of the bearing portion 5 forms a shoulder adapted to abut the end of the brake beam portion 1, thereby affording a solid seat for receiving end thrusts which may be imposed upon the trunnion, and thus taking all strain from the rivets or other fastening devices when such end thrusts are directed inwardly.

As illustrated in Figs. 1 and 2, the trunnion member is secured in position by means of the rivets 7 passing through the walls of the arbor member and the pocket.

In the form illustrated in Figs. 3 and 4, the pocket is internally screw threaded, and the arbor member is externally threaded, so that the trunnion member may be screwed into the pocket, where it is secured in place by the rivet or other suitable detachable means.

In Figs. 5 and 6, the trunnion illustrated has a wall closing its inner end, and the attachment is provided by a bolt 8 seated in said wall and in the end wall of the pocket. Relative rotation of the trunnion member and the beam is prevented by a longitudinal spline 9 formed on the arbor and adapted to engage in a suitable slot formed in the inner wall of the pocket.

The forms illustrated in Figs. 7 to 10 inclusive are provided with longitudinally directed lugs or ears. In the form illustrated in Figs. 7 and 8, these lugs 11 pass through apertures in the end of the brake beam, and are bent over to hold the trunnion in place. The form illustrated in Figs. 9 and 10 has the trunnion secured to the brake beam by means of the bolt 12 passing through the lugs and through the end of the brake beam.

In all of the forms, it is obvious that the trunnion member is removable outwardly in a direction longitudinally of the beam, by virtue of which removal and replacement may be made without unhanging the beam.

All of these forms provide a construction wherein the trunnions constituting the mountings for the brake heads are individually removable from the beam, thereby permitting their replacement when worn or broken, without making it necessary to discard the entire beam or detach it from the truck for repair.

What I claim is:

A cast metal brake beam having a recess at its end for receiving a renewable trunnion, and a trunnion secured to the end of the brake beam and designed to receive a renewable head, said trunnion having shoulders or faces seated directly against the end face of the beam around said recess which thereby affords a solid seat for receiving inwardly directed end thrusts on the trunnion, and fastening devices for holding the trunnion in position, which fastening devices are relieved from inwardly directed end thrusts on the trunnion by virtue of the direct engagement between the trunnion and the end face of the beam.

In testimony whereof I hereunto affix my signature in the presence of two witnesses, this first day of July, 1914.

CHARLES H. WILLIAMS, JR.

Witnesses:
   E. T. WALKER,
   M. F. HUNTOON.